(12) United States Patent
Telgkamp et al.

(10) Patent No.: US 7,913,568 B2
(45) Date of Patent: Mar. 29, 2011

(54) METHOD OF DIMENSIONING AND PRODUCING STIFFENED STRUCTURAL COMPONENTS, USE OF STRUCTURAL CONDITION SENSORS AND AN AIRCRAFT

(75) Inventors: Jens Telgkamp, Buxtehude (DE); Hans-Jürgen Schmidt, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/094,841

(22) PCT Filed: Dec. 15, 2006

(86) PCT No.: PCT/EP2006/069762
§ 371 (c)(1),
(2), (4) Date: Aug. 7, 2008

(87) PCT Pub. No.: WO2007/074084
PCT Pub. Date: Jul. 5, 2007

(65) Prior Publication Data
US 2009/0090813 A1    Apr. 9, 2009

(30) Foreign Application Priority Data

Dec. 29, 2005 (DE) .................. 10 2005 063 073

(51) Int. Cl.
*G01B 5/30* (2006.01)
(52) U.S. Cl. .............................. 73/760; 73/802; 73/808
(58) Field of Classification Search .................... 73/760, 73/802, 808
See application file for complete search history.

(56) References Cited

U.S. PATENT DOCUMENTS

| 4,336,595 A | 6/1982 | Adams et al. ................. 364/508 |
| 5,142,141 A | 8/1992 | Talat et al. ................ 250/227.15 |

(Continued)

FOREIGN PATENT DOCUMENTS

EP    0 952 446 A2    10/1999

(Continued)

OTHER PUBLICATIONS

H. Asslet, J. Telgkamp, "Design of Aircraft Structures Under Special Consideration of NDT", 16th WCNDT 2004-World Conference on NDT, CD-ROM Proceedings, Internet Version of~600 Papers, Aug. 30-Sep. 3, 2004—Montreal, Canada.

(Continued)

*Primary Examiner* — Max Noori
(74) *Attorney, Agent, or Firm* — Sunstein Kann Murphy & Timbers LLP (57) ABSTRACT

The invention concerns a method of dimensioning and producing stiffened structural components (4) comprising at least one shell component (6) and at least one stiffening component (8) which can be connected thereto, in which the shell component (6) and the at least one stiffening component (8) is dimensioned on the assumption of intactness of the at least one stiffening component and having regard to a predetermined safety factor and/or a predetermined structural inspection interval in which a predetermined maximum crack progression in the shell component is not to be exceeded and/or the strength of the structural component is not to fall below a predetermined minimum residual strength, and in which the at least one stiffening element (8) of the structural component dimensioned by this method is equipped with at least one structural condition sensor (30) for detecting intactness; as well as the use of structural condition sensors in an aircraft, in particular a passenger aircraft.

22 Claims, 7 Drawing Sheets

U.S. PATENT DOCUMENTS

| | | | | |
|---|---|---|---|---|
| 5,184,516 A | * | 2/1993 | Blazic et al. | 73/799 |
| 5,969,260 A | | 10/1999 | Belk et al. | 73/773 |
| 6,526,821 B1 | * | 3/2003 | Corda et al. | 73/186 |

FOREIGN PATENT DOCUMENTS

| | | | |
|---|---|---|---|
| WO | 2005/043107 A2 | 5/2005 | |

OTHER PUBLICATIONS

Russian Patent Office, Office Action—Russian Application No. 2008121601/11 (3 pages) [English Translation] Dec. 15, 2006.

Voyt et al., "Airplane Structure Design," *Machinostroyenie*, pp. 125-131 (1987).

M.C.—Y. Niu: "Airframe Structural Design, $2^{nd}$ Edition," pp. 99-100, Conmilit Press LTD, Hong Kong, Jan. 1999.

International Searching Authority, International Search Report—International Application No. PCT/EP2006/069762, dated Dec. 15, 2006 together with the Written Opinion of the International Searching Authority, 13 pages.

Eisenfuhr, Speiser & Partner, Written Reply with Amendments in Response to Written Opinion of the International Searching Authority Jun. 25, 2007, 5 pages.

* cited by examiner

METHOD OF DIMENSIONING AND PRODUCING STIFFENED STRUCTURAL COMPONENTS, USE OF STRUCTURAL CONDITION SENSORS AND AN AIRCRAFT

The invention concerns a method of dimensioning and producing stiffened structural components comprising at least one shell component and at least one stiffening component which can be connected thereto, a use of structural condition sensors for detecting the intactness of one or more stiffening components of a structural component and an aircraft having stiffened structural components.

Stiffened structural components are used in a large number of apparatuses and equipment such as for example in aircraft, in particular in passenger aircraft. They involve the use of structural components which not only determine the external shape of the aircraft but also provide the mechanical strength necessary for operation. The design or dimensioning of such structural components is frequently subjected to strict regulations, in aircraft construction for example the dominant regulations are those of the JAA (Joint Aviation Authority, here in particular the JAR 25), the FAA (Federal Aviation Administration, here in particular the FAR 25) and the EASA (European Aviation Safety Agency, here in particular the CS 25).

The fundamental external structure of a modern passenger aircraft is composed of shell components which form the outer skin of the aircraft and a series of stiffening components which are either arranged parallel to the longitudinal axis of the aircraft fuselage at the inside of the outer skin (referred to as 'stringers') or which are fixed in a radial direction around the longitudinal axis to the inside of the outer skin (referred to as 'ribs'). In order to withstand the stresses which occur in flight the fuselage structure which is formed from shell components and stiffening components in the form of stringers and ribs must be adequately dimensioned.

In order to be able to save weight and to utilise the advantage of regular structural inspections, the structure is designed to be damage-tolerant. Damage-tolerant dimensioning leads to a structure which is reliable up to the design target (service life, number of flights and so forth) and which typically is of a lower weight than a structure which exhibits long-term fatigue strength. As passenger aircraft are usually thoroughly maintained at regular intervals and in particular the structures are examined for damage such as for example cracks or delamination phenomena, it is necessary for a damage which occurs in the structure within the interval between two inspections, for example crack progression or a loss of strength, not to exceed a given value.

In terms of dimensioning, the basic starting point adopted is that a stiffening component of a structural component, which is being considered, of the fuselage structure is defective in order on that basis to calculate crack progression with at the same time outer skin cracking and thus to define an inspection interval at which the damage is discovered before reaching a critical stage. Structures which are designed in that way however are of relatively conservative dimensions as the assumption of a defective stiffening component means that the shell component would have to carry all of the stresses and is dimensioned to be correspondingly more massive. It is known however that the stiffening components with conventional types of construction usually do not suffer any defect during such an interval.

It is known that sensors can be used to detect a condition of a system or a structure. Thus, besides numerous sensors for detecting the correct functioning of actuators or control flaps, there are also kinds of sensors for detecting a condition of a structural component. Systems for detecting the condition of systems or structures are referred to as 'health monitoring systems', and so-called 'structural health monitoring' (SHM) systems are used in monitoring structures. Such systems can be equipped with sensors of the most widely varying kinds for damage discovery, for registering local changes in stress and/or recording other parameters, such as for example tearing wires, vacuum sensors or optical fibres. An example of the use of SHM systems in passenger aircraft is shown in EP 1 353 252.

The object of the invention is therefore that of reducing or entirely eliminating one of the specified disadvantages. In particular an object of the invention is to dimension a structural component in such a way that a minimum structural component weight is achieved and at the same time intactness and correct functioning can be detected. A further object of the invention is to provide a method of dimensioning and producing stiffened structural components and an aircraft, in particular a passenger aircraft, which achieves a low structural component weight and at the same time a high level of flight safety.

The object is attained by a method of dimensioning and producing stiffened structural components comprising at least one shell component and at least one stiffening component which can be connected thereto, in which the shell component and the at least one stiffening component is dimensioned on the assumption of intactness of the at least one stiffening component and having regard to a predetermined safety factor and/or a predetermined structural inspection interval in which a predetermined maximum crack progression in the shell component is not to be exceeded and/or the strength of the structural component is not to fall below a predetermined minimum residual strength, and in which the at least one stiffening element of the structural component dimensioned by this method is equipped with at least one structural condition sensor for detecting intactness.

An advantage with that method is that the structure is less conservatively dimensioned and in that way it is possible to achieve a great weight saving or a maximum weight saving. The assumption which is justified by the use of structural condition sensors, that the stiffening components—in passenger aircraft in particular stringers and ribs—are intact provides that the shell component has to carry a smaller part of the stresses which occur and to ensure adequate long-term strength is of a material strength which is less relative to usual methods. As the dimensioning operation is implemented only on the assumption of the intact stiffening components, it is necessary for that intactness also to be detected with structural condition sensors and for suitable warnings to be delivered in the event of detection of damage or the like in the stiffening components or for the inspection interval to be deliberately shortened.

In accordance with the invention there is proposed entirely new dimensioning, which involves turning away from methods which were hitherto regularly applied.

It is particularly preferred for the method to include at least one of the following steps:

a. determining the stress values acting on the structural component, b. establishing fixing positions and/or the number of the stiffening components connected to the shell component, c. establishing material strengths of the shell component and the at least one stiffening component, d. calculating the progression of a crack occurring in the shell component having regard to the stress values and/or the predetermined inspection interval and/or the number and fixing positions of the stiffening components and/or the material strengths of the shell component and/or the stiffening components, e. calculating a required structural inspection interval as the quotient of the interval between the times of a safely inspectable crack length and a critical crack length and the established safety factor, f. altering the material strengths and/or the fixing positions and/or the number of the stiffening components of the structural component for adapting the required structural inspection interval to the predetermined inspection interval using the foregoing steps, g. producing the structural component by connecting the stiffening components dimensioned in accordance with the foregoing steps, to the shell component, in particular by means of riveted, welded, adhesive, laminated and/or screw connections and the like, and h. equipping the at least one stiffening component with at least one structural condition sensor.

Knowledge of the stress values acting on the structural component is of essential significance in terms of dimensioning the structural component. By establishing fixing positions and/or the number of the stiffening components connected to the shell component, it is possible to influence the required strength of the structural component by varying those two parameters, if the fixing positions and/or the number of those stiffening components is not restricted by a standard which is predetermined by an authority, or by a usual or common design. It is necessary to establish material strengths so that this component which is composed of the specified parts can be subjected to a strength calculation procedure. Calculation of the progression of a crack occurring in the shell component is a necessity for assessing damage which occurs, in order to limit that damage within an allowable range. A further necessity for observing an allowed damage tolerance is calculating a strength which is to be expected at the end of a structural inspection interval. That residual strength is equally not to fall below a predetermined value or a value which is established by regulations. It is advantageous to calculate a required structural inspection interval for the structural component, which involves just reaching the crack progression which is still allowed, or the allowed crack strength. Altering the material strengths, the fixing positions or the number of stiffening components of the structural component is advantageous in order to adapt the previously calculated required structural inspection interval to the predetermined structural inspection interval. The variation in the specified parameters has direct effects on the crack progression or the residual strength to be expected. A maximum saving in weight of the structural component can be achieved in that way. Producing the structural component by connecting the stiffening components to the shell component by using common connecting methods is advantageous in order to provide a structural component which is of the lowest possible weight, while maintaining the predetermined level of strength. It is further necessary for such a structural component for the stiffening component or components to be equipped with at least one structural condition sensor in order to be able always to verify the dimensioning assumption of intact stiffening, in order to achieve adequate safety. It is particularly advantageous for structural components which are dimensioned in that fashion to be used in aircraft. In general terms the endeavour in relation to aircraft is to use structural components of high strength, of the lowest possible weight. The method according to the invention makes it possible to provide a structural component having those properties.

Furthermore, in accordance with the invention it is desired and provided for such a structural component to be used in passenger aircraft. When designing components for passenger aircraft, consideration has to be given to a series of regulations which in particular relate to fixedly predetermined failure probabilities, which are categorised in various classes, for components and systems. In order to provide a safeguarded failure probability in respect of a structural component which was dimensioned in accordance with the method of the invention, possible defects in the stiffening components of a structural component are reliably detected and can thus lead to required maintenance measures.

In addition it is desirable for the shell component to be used as an outer skin or as a part of an outer skin of a passenger aircraft. The outer skin of a passenger aircraft not only represents the wall that divides the cabin from the surrounding atmosphere, but at the same time with all the stiffening components it is the load-bearing structure of the aircraft fuselage. It is appropriate that it is precisely also the outer skin as the largest cohesive component of an aircraft is optimised in respect of the inherent weight thereof in accordance with the dimensioning and production method according to the invention.

It is also advantageous for the stiffening component which in this method is equipped with a structural condition sensor to be a longitudinal stiffening ('stringer') of the outer skin of a passenger aircraft. The stringers extend substantially distributed over the periphery over the entire length of the inside of the outer skin and contribute substantially to the stiffness of the aircraft fuselage. For detecting intactness thereof, it is advantageous for them to be equipped with structural condition sensors.

Furthermore it is preferable for the transverse stiffenings ('ribs') of the outer skin of a passenger aircraft also to be equipped with such structural condition sensors as the ribs are also essential components in terms of stiffening the cross-section of the outer skin of a passenger aircraft.

Structural condition sensors which are in the form of electrical tearing wires, vacuum sensors and/or optical fibres or the like are advantageous. Such structural condition sensors are mechanically relatively simple in construction and accordingly can guarantee a high level of detection reliability.

Arranging a plurality of structural condition sensors at different locations on the stiffening element or elements is advantageous as not only is it possible to detect the entire defect of such a stiffening component, but it is also possible to detect for example the progression of a defect and the direction thereof.

It is particularly advantageous if the structural condition sensors are connected to means for recording, assessing and/or transmitting the conditions of the stiffening elements. The structural condition sensors alone are not capable of informing about their detection of a defect of a stiffening component.

In addition it is preferable for the means for recording, assessing and/or transmitting the conditions of the stiffening elements to be one or more data-processing apparatuses, in particular avionic apparatuses. Such data-processing apparatuses have the capability of producing from abstract signals from a series of structural condition sensors a comprehensible image of the condition of the structure being monitored, recording that image and/or transmitting it. Such means are indispensable for ensuring that the detected defects are noticed.

It is particularly advantageous if the data-processing apparatuses upon detection of the defect in one or more stiffening elements store that defect in the form of data on a data carrier and/or transmit it to a further data-processing apparatus. In that way it is for example possible to establish after a period of operation, by means of a protocol in the form of electronic data, which components of the structure are defective in order possibly to replace them after termination of the period of operation.

It is also advantageous for the crew of the aircraft and/or the ground staff to be informed about the defect by the output of the stored and/or transmitted data with suitable output means which in particular provide visual or acoustic notifications. In the course of the ever decreasing periods of time spent on the ground, there is a need to be informed as immediately as possible about the occurrence of defects so that possibly suitable spare parts are already available when the passenger aircraft lands.

It is further advantageous for the crew of the aircraft and/or the ground staff to be informed immediately after the occurrence of the defect and/or at a later moment in time. That information can be provided either directly by data-processing apparatuses which make a suitable signal available to the pilot in the cockpit, or by data which are available to the ground staff after evaluation of a protocol.

The invention is described hereinafter by means of preferred embodiments by way of example with reference to the drawings in which.

Figure 1:
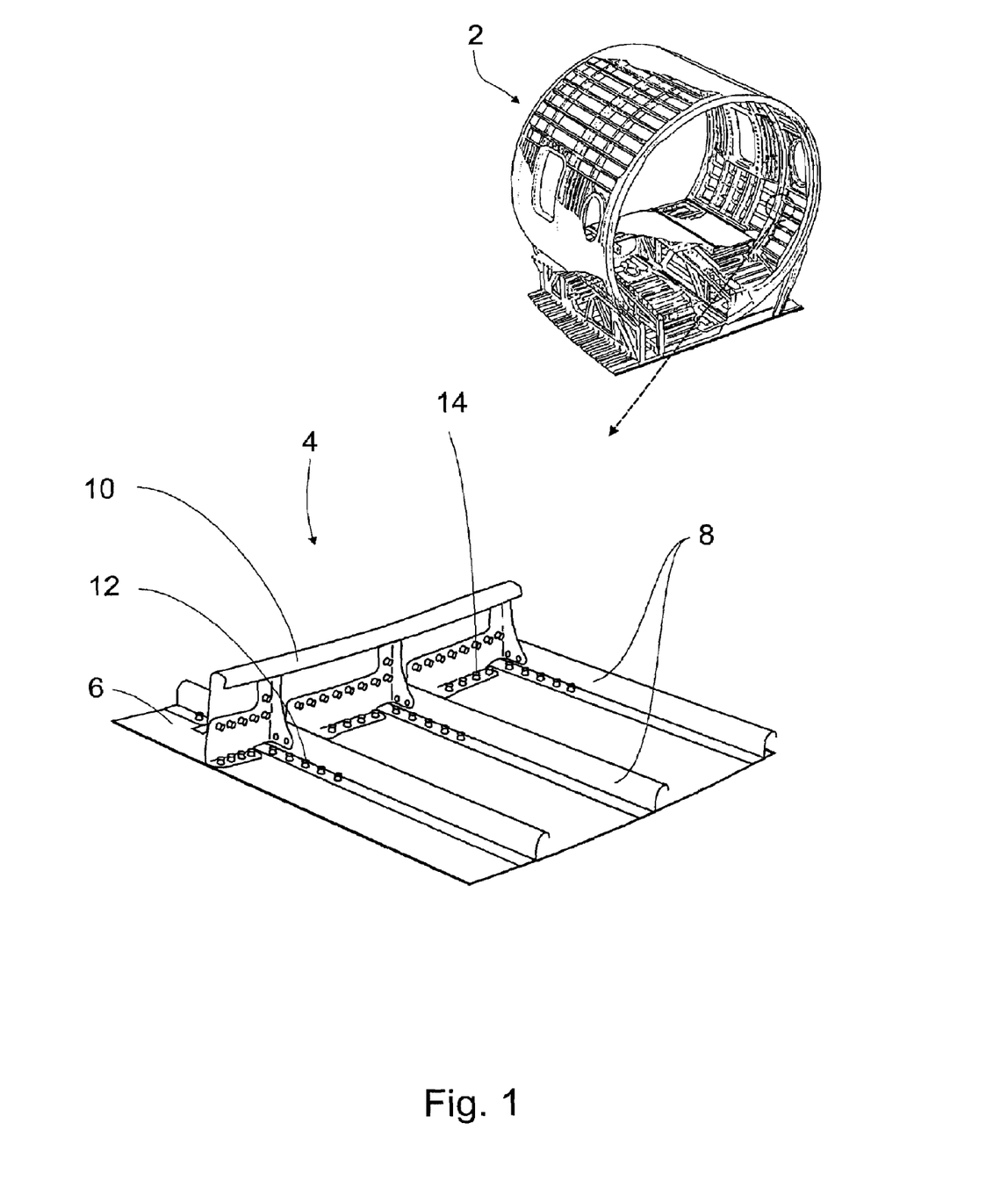
FIG. 1 shows a three-dimensional view of a structural component of a passenger aircraft.

FIG. 1 shows a part 2 of a typical construction of a passenger aircraft, which comprises a large number of shell and stiffening components. Shown by way of example is a portion of a structural component 4 which is disposed within the construction part 2. The structural component 4 comprises a shell component 6, two stringers 8 which represent stiffening components in parallel relationship with the longitudinal axis of the aircraft cabin and a rib 10 which forms a stiffening component extending radially around the longitudinal axis of the aircraft cabin. The stringers 8 and the rib 10 are connected predominantly by riveting, adhesive and welding to the shell component 6, thus FIG. 1 shows rivet connections 12 for fixing the stringers 8 to the shell component 6 and rivet connections 14 for fixing the rib 10 to the shell component 6. Usually the stringers 8 or ribs 10 are fitted to the inside of the outer skin in mutually spaced relationship in accordance with a given presetting such as for example a factory standard or the like.

With reference to the state of the art described in the opening part of this specification regarding the design or dimensioning of a structural component 4, it is usually assumed that the stringers 8 or the rib 10 are defective, so that the shell component 6 must be dimensioned to carry the entire load which occurs. The assumption of at least one defective structural component 8 and/or 10 arises out of the restricted internal inspection of the fuselage structure.

Dimensioning criteria for civil metal aircraft structures differ depending on the nature or location of the component being considered. Thus there are dimensioning criteria such as for example design in accordance with static strength and stability, deformation, material fatigue, crack progression and residual strength. This invention relates primarily to the regions of the aircraft structure in which the criteria of crack progression or residual strength are dimensioning.

The regions of the aircraft structure in which crack progression typically represents the dimensioning criterion are for example the upper shell of the fuselage as well as the shells at the underside of the aerofoils. Detection of the crack progression criterion is effected in conformity with the requirements arising out of the international regulations by numerical crack progression calculation in which the loads occurring in in-flight operation, which are also referred to in their entirety as the stress collective, form the basis for the calculation procedure.

Figure 2:
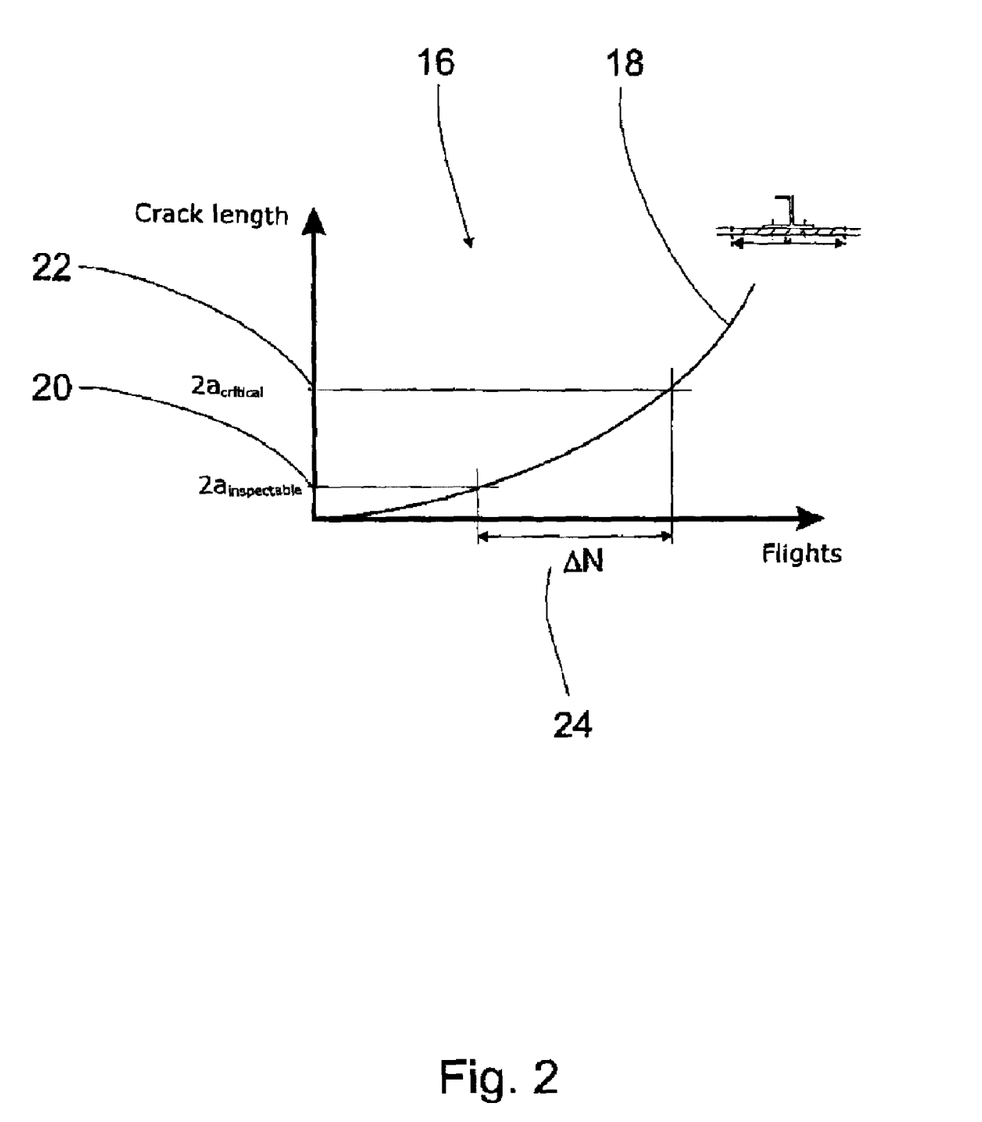
FIG. 2 shows a crack length graph for conventionally dimensioned structural components.

FIG. 2 shows by way of example for the upper shell of the rear fuselage a graph 16 with a curve 18 which shows the crack length in the upper shell in dependence on the number of flights or flying hours.

The interval $\Delta N$ (24) between the point of the safely inspectable crack length 20 and the critical crack length 22, divided by an established or usual safety factor, determines the structural inspection interval. The inspection interval which is predetermined or which is planned by a maintenance schedule may not be greater than $\Delta N$ (24). It must therefore be demonstrated that the dimensioning of the structure leads to a sufficiently slow crack progression characteristic. In that way it is possible to ensure that at any event a crack is detected within the limits of the usual inspection interval before it reaches critical dimensions.

As mentioned hereinbefore, in accordance with the state of the art at the present time it is assumed in respect of crack progression that the stiffening which is under the crack, such as for example stringers 8 or ribs 10, are defective. That assumption is required by the approval regulations as the internal stiffenings in accordance with the present state of the art are not regularly inspected or monitored by a system. The crack progression curve 18 corresponds to that assumption.

Figure 3:
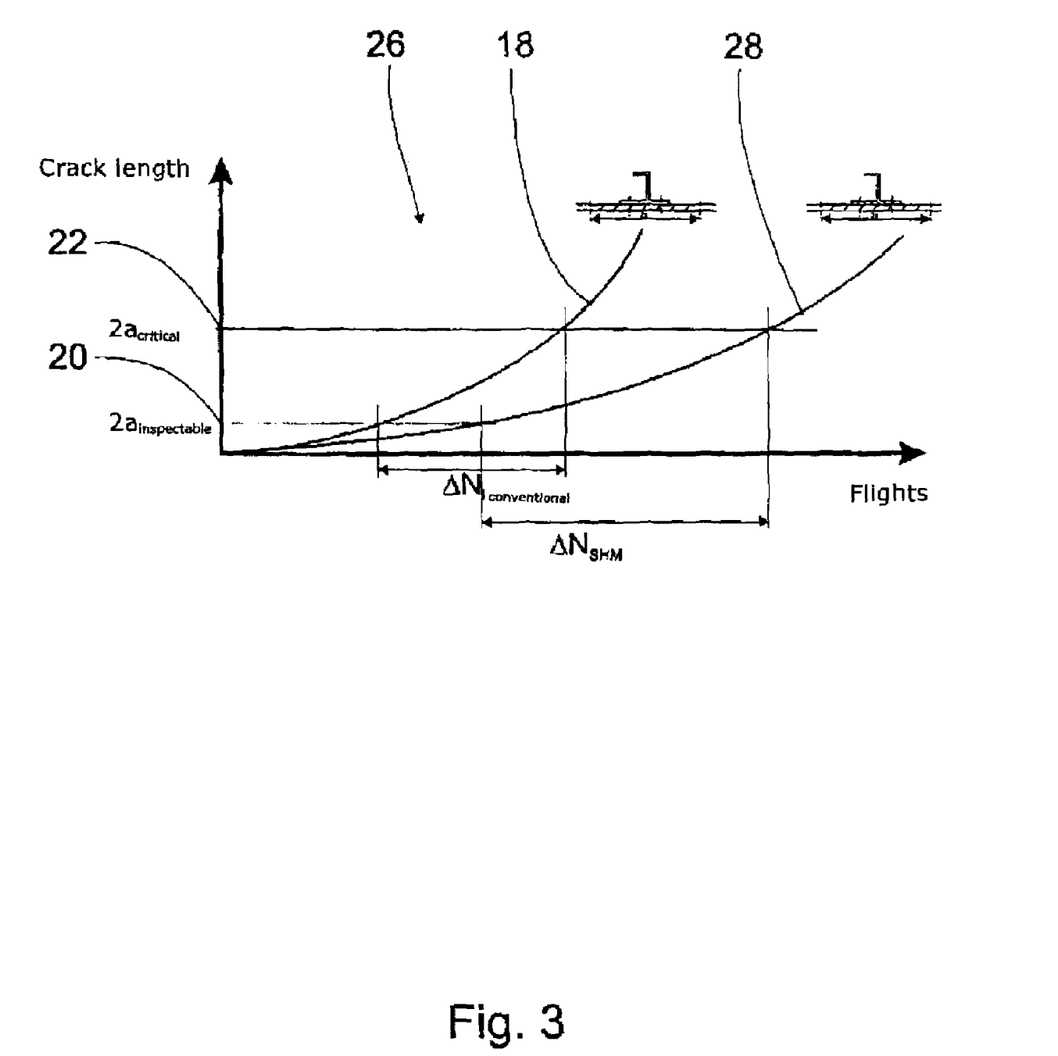
FIG. 3 shows a crack length graph for comparing a conventionally dimensioned structural component and a structural component dimensioned in accordance with the method of the invention.

FIG. 3 shows a graph 26 illustrating two different crack progression curves 18 and 28, wherein the first crack progression curve 18 is the same as that shown in FIG. 2. The second crack progression curve 28 is ascertained on the basis of intact stiffening components. By virtue of that assumption, the strength ascertained by calculation of the structural component exceeds that of the conventionally dimensioned component.

A crack progression which is slowed down—compared to the assumption of defective stiffening components—would result in a longer maintenance interval, with the same component dimensions and the same structural weight. That advantage can be used to dimension the structure to be lighter so that the originally required structural inspection interval is attained, but the structure has a weight advantage over the conventionally dimensioned structure (progression curve 18). Ultimately therefore, it is already assumed when designing the aircraft structure that the conditions of the stringers 8 and the ribs 10 in later operation of the aircraft will always be known. The altered design can be justified on the basis of that gain in knowledge.

Those aspects apply not only to the criterion of crack progression but also that of residual strength. Structural components which are dimensioned in accordance with the method of the invention, with the same dimensions and the same structural weight by virtue of the assumption of intact stiffening components, have by calculation a higher residual strength and as a result also a longer necessary structural inspection interval. In some regions of the structure, accident-induced damage must be assumed and detected in respect of residual strength. In those regions, in the individual case it will not be possible for the dimensioning to be of a less conservative nature by virtue of the use of structural condition sensors.

So that the conditions of the stiffening components in later operation of the aircraft are always known, it is necessary for the stiffening components to be equipped with structural condition sensors. Upon detection of defects within the stiffening components, such a signal can be produced that inspection of the structural component involved can be scheduled in good time.

Figure 4:
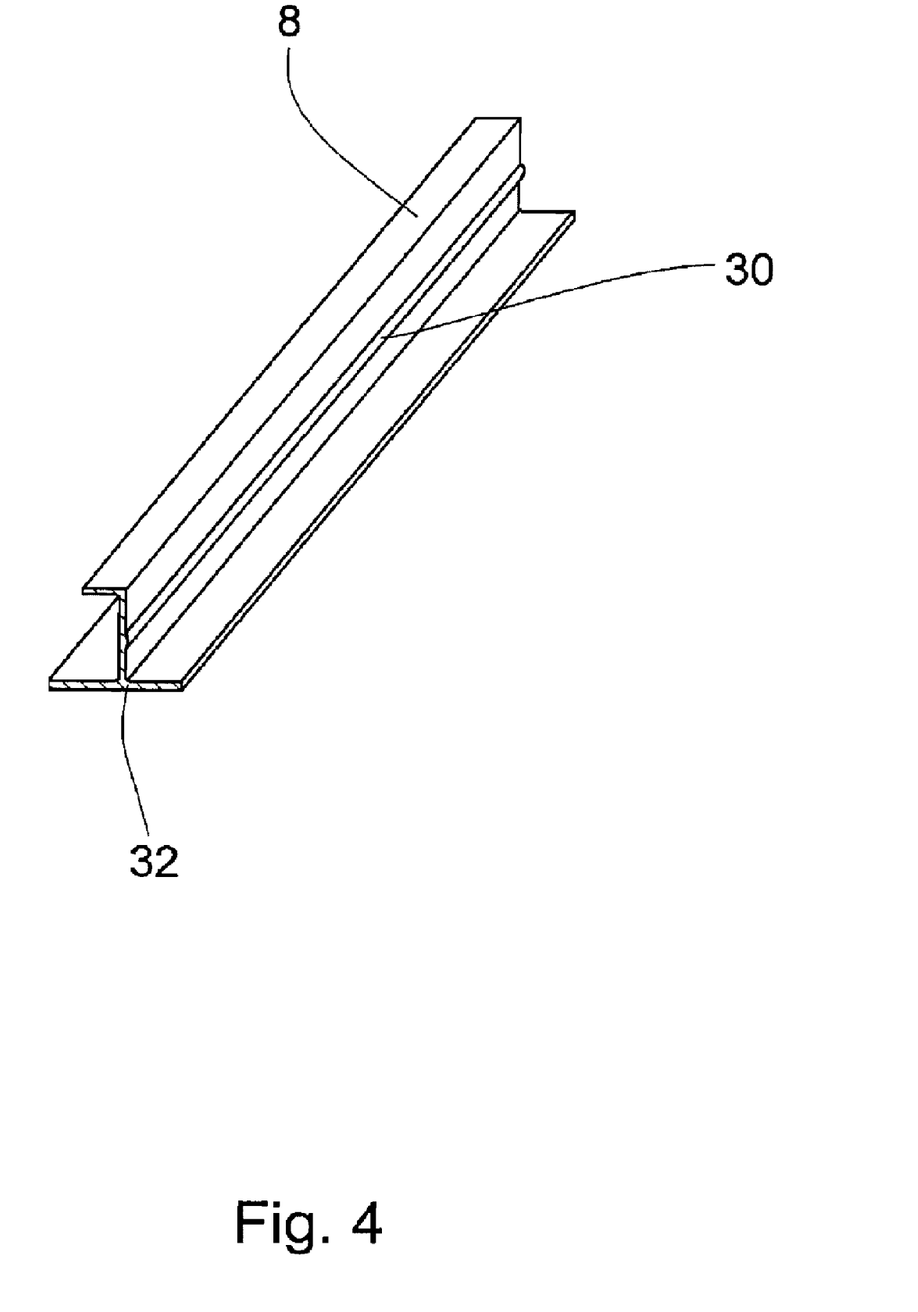
FIG. 4 shows a stiffening component equipped with a structural condition sensor.

FIG. 4 shows by way of example a stringer 8 equipped with a structural condition sensor 30. That structural condition sensor is disposed at a longitudinal side of the stringer 8 at a uniform point on the cross-section 32 of the stringer. That makes it possible to detect a fracture of the stringer 8. If the structural condition sensor 30 is for example in the form of a tearing wire which tears through when the stringer 8 fractures and separates a previously existing contact at an apparatus for recording sensor data, the fracture of the stringer 8 can be detected. FIG. 4 shows a structural condition sensor 30 which is disposed approximately at a mid-height position on the cross-section 32 of the stringer 8. By virtue of that arrangement it is possible to already detect cracking of the stringer 8 or the like, prior to total failure thereof, when the crack propagates from an end of the cross-section, for example from the base, to another point on the cross-section thereof, for example to the top.

It would moreover also be possible for a stringer 8 to be equipped with a plurality of such structural condition sensors 30 which are arranged at different heights in mutually displaced relationship on a side surface of the stringer 8. That makes it possible to detect the direction and the progression of a crack or fracture. In accordance with the invention the stiffening component to be monitored is monitored substantially along the entire length thereof to ascertain whether a given point in the cross-section of the stiffening component is intact over the entire length.

The actual cross-section of the stiffening component can differ from that shown, for example there can be a stringer 8 with only one row of rivets and of a cross-section different from that shown in FIG. 4. Furthermore the location to be monitored in the cross-section 32 of the stringer 8 does not necessarily have to be at the position shown in FIG. 4, but can also be closer to the base or the top of the cross-section 32.

The description set forth herein regarding stiffening components in the form of stringers is to be interpreted here by way of example and is not restricted thereto. All other stiffening components can equally well be fitted with structural condition sensors, in particular ribs.

Figure 5A:
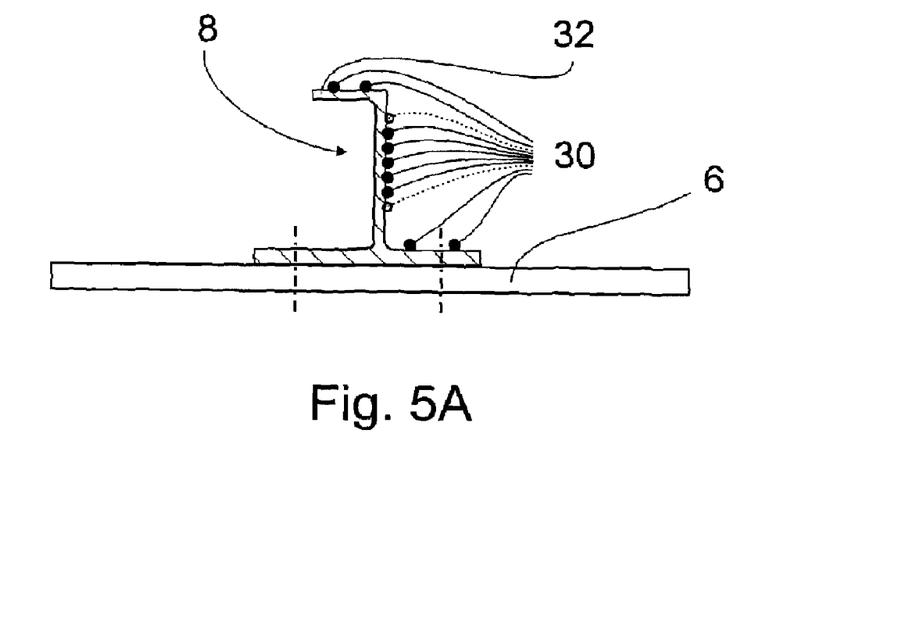
FIGS. 5A and 5B show a stiffening component connected to a shell component.
Figure 5B:
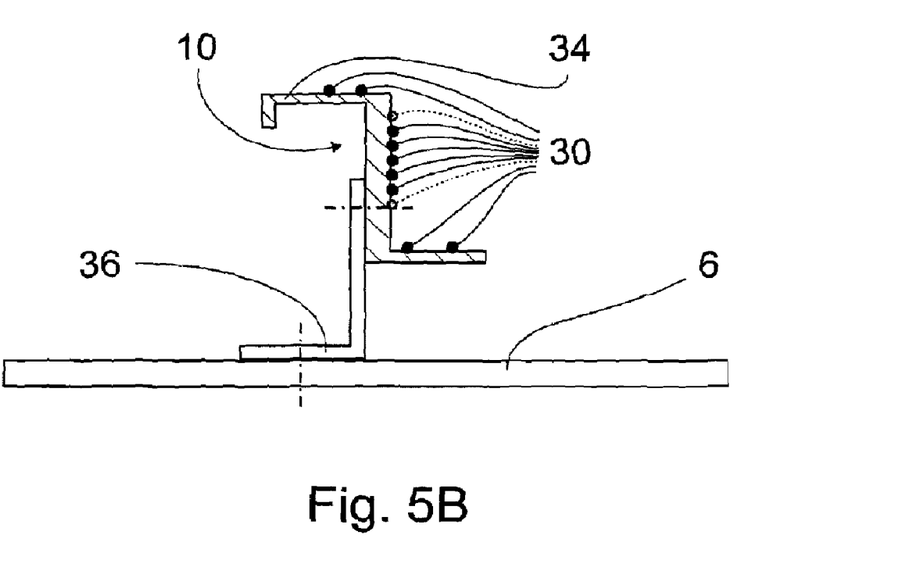

FIG. 5A shows a stringer 8 which is connected to a shell component 6, illustrating a number of options in regard to the placement of structural condition sensors 30. FIG. 5B also shows a rib 10 of a Z-shaped cross-section 34 which is connected to the shell component 6 by means of a connecting portion 36. Also illustrated here are options in terms of the placement of structural condition sensors 30, such as for example at the outer web, at the base or the like.

Figure 6:
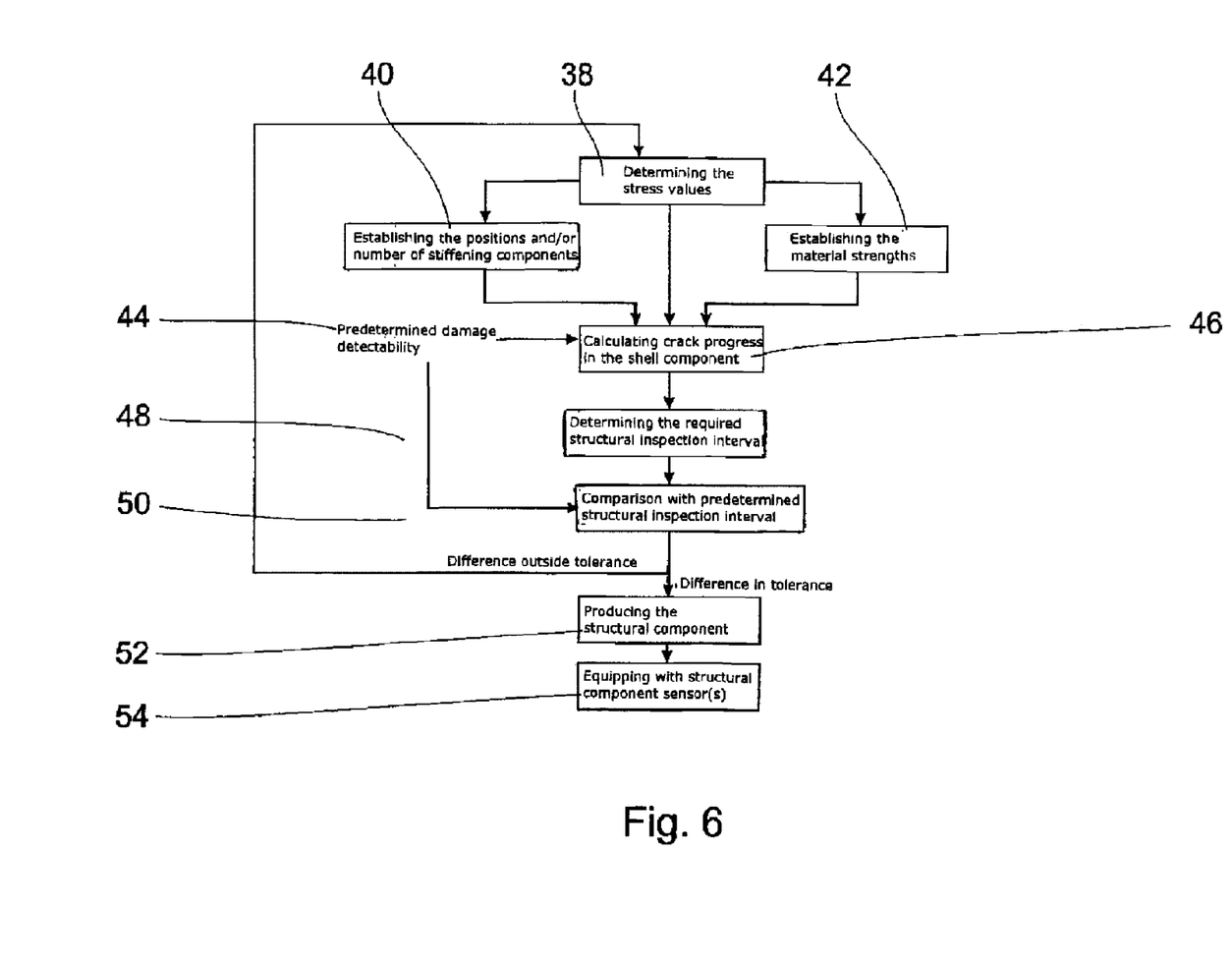
FIG. 6 shows a block diagram relating to the method of dimensioning and producing a structural component in relation to the desired crack progression characteristic.

FIG. 6 shows a block diagram illustrating the method of dimensioning and producing a structural component.

The method begins with determining the stress values (identified by the block 38), followed then by establishing the positions and/or the number of the stiffening components 40 and establishing the material strengths 42, whereby having regard to a predetermined damage detectability 44 it is possible to calculate crack progression to the critical crack length, having regard to predetermined loadings in the shell component, as indicated at 46. On the basis thereof, it is possible to determine a required structural inspection interval as at 48, which is compared to the predetermined structural inspection interval, as at 50. In the event of a difference in the intervals which is outside a usual tolerance, that leads to the method being repeated from block 38. If a difference which is within a tolerable limit occurs, then there follow the procedure for producing the structural component 52 and equipping it with structural condition sensors 54.

In comparison with conventionally or conservatively designed structural components, the structural component produced by this method is of lower weight, but it satisfies the prerequisites for a crack progression which is not to be exceeded, within a predetermined structural inspection interval, whereby however it is necessary for the stiffening components used to be equipped with structural condition sensors.

Figure 7:
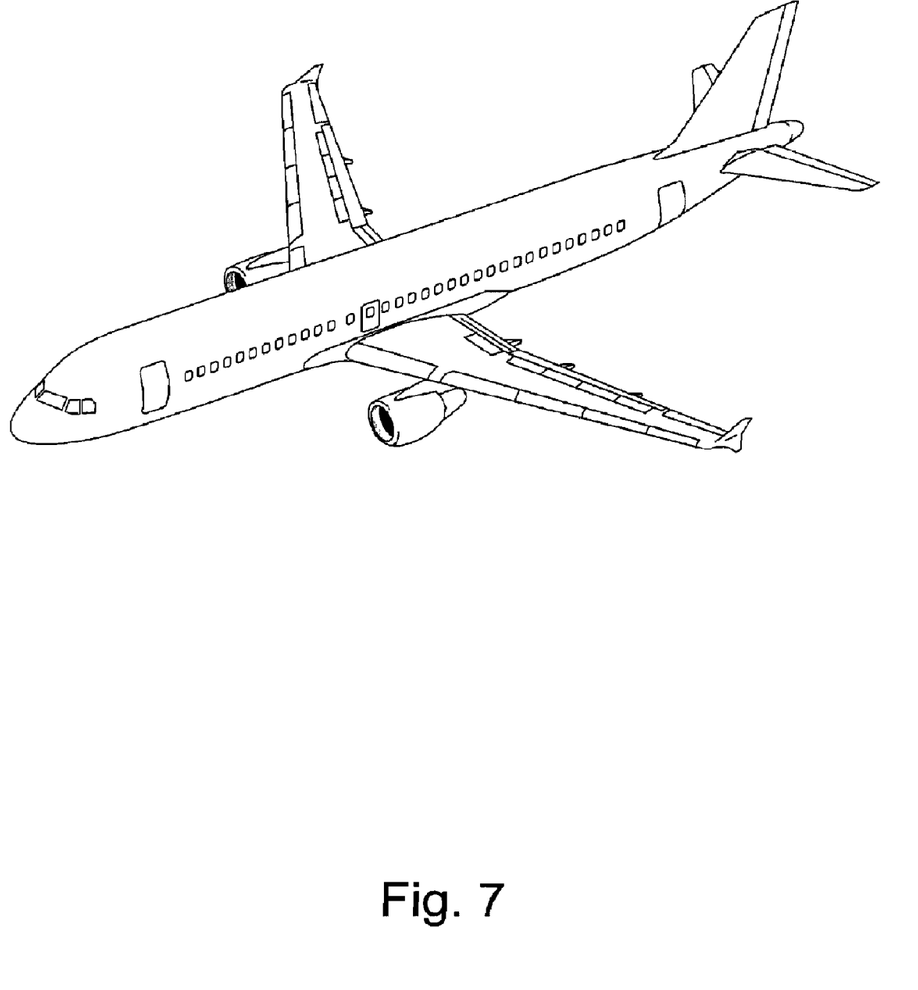
FIG. 7 shows a passenger aircraft.

Finally FIG. 7 shows an aircraft according to the invention in the form of a passenger aircraft equipped with structural components which are dimensioned and produced in accordance with the invention, as are shown by way of example in FIG. 1.

The methods and apparatuses described hereinbefore only represent embodiments by way of example of the invention and do not serve to limit the scope of the invention thereto. It is possible to envisage a large number of other embodiments which are not limited to equipping stringers and ribs of a structural component of an aircraft, but can also be expanded to other structural components of other apparatuses.

The invention claimed is:

1. A method of dimensioning and producing stiffened structural components having at least one shell component and at least one stiffening component, the method comprising:

dimensioning the at least one shell component and the at least one stiffening component based upon at least one of (1) a predetermined safety factor and (2) a structural inspection interval in which a predetermined maximum crack progression in the shell component is not to be exceeded and the strength of the structural component does not fall below a predetermined minimum residual strength, the dimensioning also based upon the assumption of intactness of the at least one stiffening component; and securing the at least one stiffening component to the shell component to form the stiffened structural component, the at least one stiffening component having a long dimension along the at least one shell component and at least one elongated structural sensor positioned mid-height on the at least one stiffening component, the elongated structural condition sensor extending substantially along the long dimension of the stiffening component and detecting intactness of the stiffened structural components.

2. A method according to claim 1 wherein the method further includes at least one step selected from the group consisting of:

a. determining the stress values acting on the structural component,
b. establishing fixing positions of the stiffening components connected to the shell component,
c. establishing the number of the stiffening components connected to the shell component, d. establishing material strengths of the shell component and the at least one stiffening component, e. calculating a progression of a crack occurring in the shell component based upon at least one selected from the group consisting of the stress values; the predetermined inspection interval; the number and fixing positions of the stiffening components; the material strengths of the shell component; and the material strengths of the stiffening components, f. calculating a required structural inspection interval as the quotient of the interval between the times of a safely inspectable crack length and a critical crack length and the established safety factor, g. altering at least one selected from the group consisting of: the material strengths, the fixing positions of the stiffening components, and the number of the stiffening components of the structural component for adapting the required structural inspection interval to the predetermined inspection interval, h. producing the structural component by connecting the stiffening components dimensioned in accordance with the foregoing steps, to the shell component, by means of at least one selected from the group consisting: of riveted connections, welded connections, adhesive connections, laminated connections, and screw connections, and i. equipping the at least one stiffening component with at least one structural condition sensor.

3. A method according to claim 1 further comprising calculating a required structural inspection interval as the quotient of the duration until a critical residual strength is reached and the established safety factor.

4. A method according to claim 1 in which the structural component is used in aircraft.

5. A method according to claim 1 in which the structural component is used in passenger aircraft.

6. A method according to claim 5 in which the shell component is used as at least part of an outer skin of a passenger aircraft.

7. A method according to claim 6 in which the at least one stiffening component is a longitudinal stiffener of the outer skin of a passenger aircraft.

8. A method according to claim 6 in which the at least one stiffening component is a transverse stiffener of the outer skin of a passenger aircraft.

9. A method according to claim 1 in which the structural condition sensors are at least one selected from the group consisting of: electrical tearing wires, vacuum sensors, and optical fibres.

10. A method according to claim 1 in which a plurality of structural condition sensors are arranged at different locations of the at least one stiffening component such that the stiffening component is monitored substantially along its entire length.

11. A method according to claim 1 in which the structural condition sensors are connected to at least one selected from the group consisting of: means for recording the conditions of the stiffening component, means for assessing the conditions of the stiffening components, and means transmitting the conditions of the stiffening components.

12. A method according to claim 11 in which the means for recording, means for assessing, and means for transmitting the conditions of the stiffening components are one or more data-processing apparatuses.

13. A method according to claim 12 in which the data-processing apparatuses in the event of detection of the defect of one or more stiffening components store said defect in the form of data on a data carrier.

14. A method according to claim 13 further comprising notifying at least one of the aircraft crew and ground staff about the defect by outputting the data with an output means.

15. A method according to claim 14 wherein the at least one of the crew of the aircraft and ground staff is informed immediately after the occurrence of the defect.

16. A method for detecting the intactness of one or more stiffening components of a structural component comprising:
providing a structural component having at least one shell component and at least one stiffening component connected to the at least one shell component, the structural component dimensioned such that at least one condition is met from the group consisting of: a predetermined maximum crack progression in the shell component is not exceeded and the strength of the structural component does not fall below a predetermined minimum residual strength within a predetermined structural inspection interval; and
detecting the intactness of the at least one stiffening component using at least one elongated structural condition sensor, the at least one stiffening component having a long dimension along the at least one shell component, the at least one elongated structural condition sensor positioned mid-height on the at least one stiffening component and extending substantially along the long dimension of the stiffening component.

17. An aircraft comprising:
at least one stiffened structural component having at least one shell component and at least one stiffening component, the at least one shell component and the at least one stiffening component being dimensioned based upon at least one selected from the group consisting of: (1) a predetermined safety factor and (2) a predetermined structural inspection interval in which a predetermined maximum crack progression in the shell component is not to be exceeded and the strength of the structural component is not to fall below a predetermined minimum residual strength, the at least one structural component also being dimensioned on an assumption of intactness of the at least one stiffening component, the stiffening component having a long dimension along the at least one shell component; and
at least one elongated structural condition sensor positioned mid-height on the at least one stiffening component and extending substantially along the long dimension of the stiffening component the at least one elongated structural condition sensor detecting intactness of the stiffened structural component.

18. An aircraft according to claim 17 wherein the at least one elongated structural condition sensor includes a plurality of structural condition sensors substantially parallel to one another at different heights on a side surface of the at least one stiffening component and extending substantially along the long dimension of the at least one stiffening component.

19. A method according to claim 1 wherein the at least one elongated structural condition sensor includes a plurality of elongated structural condition sensors substantially parallel to one another at different heights on a side surface of the at least one stiffening component and extending substantially along the long dimension of the at least one stiffening component.

20. A method according to claim 12 wherein the one or more data-processing apparatuses are avionic apparatuses.

21. A method according to claim 12 wherein the data-processing apparatuses transmit data to a further data-processing apparatus in the event of detection of a defect of one or more stiffening components.

22. A method according to claim 16 wherein the at least one elongated structural condition sensor includes a plurality of elongated condition sensors substantially parallel to one another at different heights on a side surface of the at least one stiffening component and extending substantially along the long dimension of the at least one stiffening component.

* * * * *

UNITED STATES PATENT AND TRADEMARK OFFICE
CERTIFICATE OF CORRECTION

| | | |
|---|---|---|
| PATENT NO. | : 7,913,568 B2 | Page 1 of 1 |
| APPLICATION NO. | : 12/094841 | |
| DATED | : March 29, 2011 | |
| INVENTOR(S) | : Telgkamp et al. | |

It is certified that error appears in the above-identified patent and that said Letters Patent is hereby corrected as shown below:

In column 9, line 61
replace "stiffening component"
with "stiffening components"

In column 9, line 62
replace "means transmitting"
with "means for transmitting"

Signed and Sealed this
Fourteenth Day of June, 2011

David J. Kappos
*Director of the United States Patent and Trademark Office*